June 18, 1929.　　　J. ZUBATY　　　1,717,645

HEAT INDICATOR

Filed Sept. 26, 1927

Inventor
Joseph Zubaty

By Blackmore, Spencer & Huth
Attorneys

Patented June 18, 1929.

1,717,645

UNITED STATES PATENT OFFICE.

JOSEPH ZUBATY, OF FLINT, MICHIGAN, ASSIGNOR TO A C SPARK PLUG COMPANY, OF FLINT, MICHIGAN, A COMPANY OF MICHIGAN.

HEAT INDICATOR.

Application filed September 26, 1927. Serial No. 222,098.

This invention relates to a heat indicator and has particularly to do with a heat indicating device of the type ordinarily mounted on or in place of the radiator cap of an automotive vehicle.

One drawback of the heat indicators with which applicant is familiar resides in the fact that they are not readily visible to the operator at all times. Even in daylight it is sometimes not easy for the operator to be able to detect the change in color which accompanies the rise in temperature past the critical point.

It is an object of the present invention to provide a heat indicator for use in a radiator cap which will be rendered clearly visible to the operator at night by the light from an approaching car or by the sun's rays in the daytime when the car is moving toward the sun.

The object of the invention is accomplished by providing a heat indicating element in place of the usual cap of the radiator. This heat indicating element is preferably circular in form and is provided with a plurality of louvres. The side of the heat indicating member toward the chauffeur has applied thereto a coating of heat sensitive paint while at the opposite side the louvres are highly polished or formed into a reflecting surface. As the rays from the headlights of an approaching automobile or of the sun strike the polished surface of the louvres the light rays will be reflected on to the heat sensitive paint surface and cause it to be rendered visible to the driver.

The louvered heat indicator is placed at one side of the cap portion of the radiator, preferably the rear side, and means is provided to conduct the vapors from the radiator to the heat indicator. A novel mounting structure is also provided consisting of a tower having a slot at its rearwardly facing portion and this tower projects from the radiator and has secured thereto a casting which holds the heat indicator. Suitable piping leads from the space above the water level and returns to the overflow pipe, this piping passing through the slot in the tower and about the heat indicator. The casting has a closure which may be secured over the tower opening and this casting and closure take the place of the usual cap.

This invention is disclosed on the accompanying drawing in which.

Figure 1:
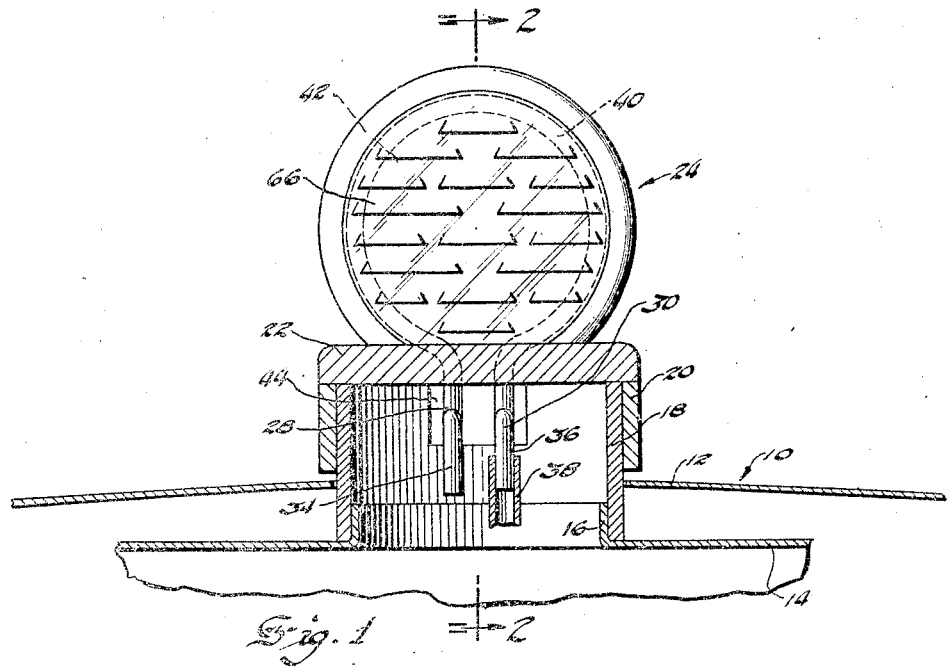
Figure 1 is a view looking from the front of a portion of the radiator of an automotive vehicle (line 1—1 of Fig. 2) having my invention applied thereto, with parts shown in section.

Referring to the numbered parts on the drawing, 10 indicates the usual radiator of an automotive vehicle having a shell 12 and an upper tank 14. The tank 14 is provided with the flanged extension 16 rigidly secured to a dome or tower 18 extending through the shell 12. These parts are usual with automotive vehicles and form no part of the present invention.

Figure 2:
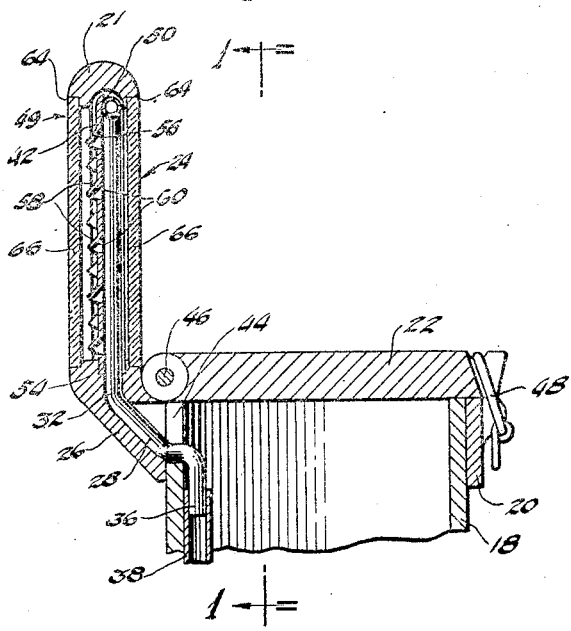
Figure 2 is a section on the line 2—2 of Figure 1.

Secured to the tower 18 is a casting 20 provided with a cover 22 at its upper portion and this casting serves as a mounting or support for the heat indicating element indicated as a whole at 24. The casting 20 comprises the right angled frame or extension 21 preferably ring shaped serving as a mounting for the heat indicator 24. This casting 20 is also provided with an enlarged portion 26 at its left hand side as viewed in Fig. 2 and this enlarged portion is provided with two passages 28 and 30 for the reception of a pipe or tube 32 having an inlet at 34 and an outlet at 36. The outlet 36 terminates in the overflow pipe 38 of the radiator. The inlet and outlet ends 34 and 36 of the tube 32 pass through a notch or cut-out portion 44 in the tower 18, this notch coinciding in position with the enlarged portion 26 of the casting 20. The upper portion of the tube 32 is bent into circular form as indicated at 40 in Fig. 1 and contacts with a metal plate or disc 42 forming a part of the heat indicator. The hot vapors from the water in the tank 14 pass into tube 32 at the inlet opening 34, around the circular portion 40, and are discharged at the outlet 36 into the overflow 38 of the radiator. The heat of the hot vapors is delivered to the disc 42 as the vapors pass through the tube 32.

The casting 20 may be secured to the tower 18 in any suitable way. The cover 20 is shown as hinged at 46 and provided with a suitable latch as shown at 48. To fill the radiator, the latch 48 is released and the cover 22 swung on its hinge 46 which exposes the opening in the tower 18.

Figure 3:
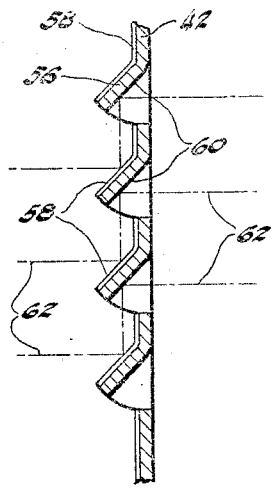
Figure 3 is an enlarged sectional detail of the louvres showing the manner in which the oncoming rays are reflected.

The upper portion 49 of the heat indicating element 24 is circular in form although any other suitable shape may be used. The tube 32 is rigidly applied as shown at 50 to the metallic plate or disc 42 rigidly secured as at 54 to the lower or enlarged portion 26 of the casting. The plate or disc 42 is provided with a plurality of louvres 56 and these louvres as well as the flat portion of the disc 42 are provided with a coating 58 of any suitable heat sensitive paint on the side toward the driver. The opposite side 60 of the louvres is formed into a reflecting surface, the purpose of which is to direct the light rays of an oncoming vehicle or of the sun downwardly on to the heat sensitive paint surface 58. When the temperature of the vapors of the water cooling system rises above the critical point for the heat sensitive paint, the color thereof will change and indicate to the driver that the danger point has been reached. This change in color will be rendered more visible by the rays of light reflected from the polished or reflecting surface 60 as shown by the dot and dash lines 62 in Figure 3.

The upper portion 49 of the heat indicating element is preferably provided on both sides with rabbets 64 for the reception of windows or pieces of glass 66, the purpose of which is to enclose the disc 42 and to prevent the accumulation of dust and dirt on the reflecting and painted surfaces 60 and 58 respectively. The windows 66 may obviously be readily cleaned.

The louvred surface of the heat indicator does not interfere with its efficiency as compared with a plain surface indicator. The louvred surface is just as readily seen as a plain surface and has the added advantage of utilizing the reflected rays of the sun or of an approaching vehicle or of any other luminous body.

The operation of the device is clear from the foregoing description.

I claim:

1. In a heat indicator, a member on said indicator to which heat is applied, means for conducting heat to the member, means on said indicator for transmitting light from one side of the member to the other, and means on said other side to indicate temperature changes.

2. The combination of claim 1, said last named means comprising a heat sensitive paint applied to said member.

3. The combination of claim 1, said second named means comprising louvres in said indicator.

4. The combination of claim 1, said second named means comprising louvres in said indicator, said louvres having a reflecting surface on one side and a heat sensitive paint on the opposite side.

5. In an automotive vehicle including a radiator, a cap thereon including a plate having a heat indicating surface on the side toward the operator and means on said plate for reflecting the light from an approaching car on said surface.

6. In an automotive vehicle including a radiator, a cap thereon including an element provided on the side toward the operator with a heat indicating surface, and louvres in said element provided on their forward side with a light reflecting surface.

7. In an automotive vehicle including a radiator, a cap thereon, an element on said cap provided with louvres, said element being provided on one side with a reflecting surface and on the other side with a heat indicating surface.

8. In combination with an automotive vehicle, a heat indicator applied to the radiator cap, a louvred disc forming a part of said indicator, a tube for conducting vapors from the radiator past the disc, a heat sensitive paint on one side of the disc adapted to change color when the temperature of the vapors reach a certain degree, and louvres in said disc to reflect light onto the paint side.

9. In combination with the radiator of an automotive vehicle, a mounting member secured to the radiator, said mounting member comprising a right angled extension serving as a retainer for a heat indicator, a hinged cover on said mounting serving as a closure for the water opening of the radiator, and means to secure the non-hinged side of the cover to the mounting.

10. In combination with an automotive vehicle having a radiator, a dome on said radiator, a heat indicator secured to said dome comprising a frame, a plate mounted in said frame, means for transmitting heat from the radiator to said plate, means on said plate for indicating heat changes, and means in said plate for transmitting light from in front of the vehicle to said heat indicating means on the rear side of said plate.

11. The structure of claim 10, said indicator and dome having conformable openings to accommodate the heat transmitting means.

12. In combination with the radiator of an automotive vehicle, a frame secured to the radiator cap, a heat indicator mounted in the frame including means for conducting fluid from the radiator directly to the edge of the indicator and returning the fluid inside the radiator cap.

13. In combination with the radiator of an automotive vehicle, a circular frame secured to the radiator cap, a plate mounted in said frame, a tube secured at the edge of the plate for transmitting fluid from and returning it to the radiator cap, and means on said plate for indicating temperature differences.

14. The structure of claim 13, and means for transmitting light from one side of said indicator to the other side onto said temperature indicating means.

In testimony whereof I affix my signature.

JOSEPH ZUBATY.